(12) United States Patent
Guday et al.

(10) Patent No.: US 8,108,398 B2
(45) Date of Patent: Jan. 31, 2012

(54) AUTO-SUMMARY GENERATOR AND FILTER

(75) Inventors: Shai Guday, Redmond, WA (US); Bret P. O'Rourke, Kirkland, WA (US); John Mark Miller, Kirkland, WA (US); James Morris Alkove, Woodinville, WA (US); Andrew David Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1012 days.

(21) Appl. No.: 11/771,445

(22) Filed: Jun. 29, 2007

(65) Prior Publication Data

US 2009/0006369 A1   Jan. 1, 2009

(51) Int. Cl.
*G06F 17/30* (2006.01)
(52) U.S. Cl. .............. 707/739; 704/9; 704/10; 707/738; 707/748
(58) Field of Classification Search .................. 707/737, 707/739
See application file for complete search history.

(56) References Cited

U.S. PATENT DOCUMENTS

| | | | |
|---|---|---|---|
| 5,708,825 A * | 1/1998 | Sotomayor | 715/205 |
| 6,202,062 B1 * | 3/2001 | Cameron et al. | 1/1 |
| 6,205,456 B1 * | 3/2001 | Nakao | 715/201 |
| 6,424,362 B1 * | 7/2002 | Bornstein et al. | 715/854 |
| 6,751,776 B1 * | 6/2004 | Gong | 715/203 |
| 6,865,572 B2 * | 3/2005 | Boguraev et al. | 1/1 |
| 7,346,494 B2 * | 3/2008 | Ando et al. | 704/9 |
| 7,624,346 B2 * | 11/2009 | Miyamori | 715/719 |
| 7,647,356 B2 * | 1/2010 | Gupta | 1/1 |
| 7,788,262 B1 * | 8/2010 | Shirwadkar | 707/737 |
| 7,925,496 B1 * | 4/2011 | Rubin | 704/7 |
| 2004/0117740 A1 * | 6/2004 | Chen et al. | 715/531 |
| 2004/0122657 A1 * | 6/2004 | Brants et al. | 704/9 |
| 2005/0203970 A1 * | 9/2005 | McKeown et al. | 707/203 |
| 2005/0262108 A1 * | 11/2005 | Gupta | 707/100 |
| 2007/0094247 A1 * | 4/2007 | Chowdhury et al. | 707/4 |
| 2007/0271297 A1 * | 11/2007 | Jaffe et al. | 707/104.1 |
| 2008/0184145 A1 * | 7/2008 | Gould | 715/764 |
| 2009/0319342 A1 * | 12/2009 | Shilman et al. | 705/10 |

\* cited by examiner

*Primary Examiner* — Charles Rones
*Assistant Examiner* — Mellissa M Chojnacki
(74) *Attorney, Agent, or Firm* — Lee & Hayes, PLLC

(57) ABSTRACT

A system that facilitates data presentation and management includes at least one database to store a corpus of data relating to one or more topics. The system further includes a summarizer component to automatically determine a subset of the data over the corpus of data relating to at least one of the topic(s), wherein the subset forms a summary of at least one topic.

19 Claims, 12 Drawing Sheets

AUTO-SUMMARY GENERATOR AND FILTER

BACKGROUND

As various forms of media have increased, users now have to deal with information overload. Conducting a search on the Internet can often generate thousands of hits where each hit can be a multi-page document or presentation. Other media forms such as television or even presentations such as might be seen from a display can also overload one's senses with more information than can be processed at a given time. This may even require taking in useless information that would be better left unprocessed.

Nowhere is information gathering and processing more evident than the common employment of a search engine. Search engines are associated with a program that searches documents for specified keywords and returns a list of the documents where the keywords were found. Although the search engine is really a general class of programs, the term is often used to specifically describe systems that enable users to search for documents on the World Wide Web and other information newsgroups. As desktop computing platforms have become more sophisticated, search capabilities similar to those provided by the typical Web search engine have migrated on to the desktop platform as well. Thus, local databases associated with the desktop can be searched for information in a similar manner as larger search engines comb the Internet for information. Typically, a search engine operates by sending out a crawler to fetch as many documents as possible. Another program, called an indexer, then reads these documents and creates an index based on the words contained in each document. Each search engine uses a proprietary algorithm to create its indices such that, ideally, only meaningful results are returned for each query.

Search engines are considered to be the key to finding specific information on the vast expanse of the World Wide Web and other information sources. Without sophisticated search engines, it would be virtually impossible to locate data on the Web without knowing a specific universal recourse locator (URL). When people use the term search engine in relation to the Web, they are usually referring to the actual search forms that search through databases of HTML documents, initially gathered by a robot. There are basically three types of search engines: Those that are powered by robots (called crawlers; ants or spiders) and those that are powered by human submissions; and those that are a hybrid of the two.

Crawler-based search engines are those that use automated software agents (called crawlers) that visit a Web site, read the information on the actual site, read the site's meta tags and also follow links that the site connects to performing indexing on all linked Web sites as well. The crawler returns all that information back to a central depository, where the data is indexed. The crawler will periodically return to the sites to check for any information that has changed. The frequency with which this happens is determined by the administrators of the search engine. Human-powered search engines rely on humans to submit information that is subsequently indexed and catalogued. Thus, only information that is submitted is put into the index.

One deficiency of present data gathering techniques relates to how data is collected, returned, and subsequently presented to the user for respective searching and data gathering resources. Most search results include the first few words of a document or the title of the document itself. Often times however, the first few words of a document or file are ambiguous, incomplete, or misleading as to the actual contents of the file. Moreover, users are often forced to select a document, scan though its contents, and then finally make a determination as to the usefulness of the data contained therein. As can be appreciated, this can take more time to determine whether a returned document has value to the user and often causes users to process information that is actually superfluous to the task at hand. Even in common desktop arrangements, users are often forced to scan through many files, observe the data contained in the files, and make a determination as to the usefulness of the files before searching other potential candidates they may be looking for.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

An automatic summary system is provided that has the capability to analyze a large corpus of data and synthesize or summarize a subset of data to be presented in a more manageable form for a user. This can include determining non-related material or superfluous material and filtering out such data in real time. Thus, users can hone in on relevant and desired data in an efficient manner without having to weed through extraneous or more detailed data that is not needed at a given time. In contrast to present data gathering techniques, automatic summaries are derived by analyzing across a given data source (or sources) rather than just capturing the first few words or title of a source. In this manner, users can control in a more efficient manner what data they are exposed to and what sources should be pursued in more detail.

Controls can be provided to let users adjust the amount of data provided in a given summary and to control the amount of respective filtering applied. Summarized data can be employed as part of an interest database to automatically bring one up to speed on a given subject and in a rapid manner. This can include summarizing or filtering photographic libraries which are tailored to be most relevant to a user's current interests. Interests can be determined from user profiles and context database than can be updated, trained, and monitored over time.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided for automatically summarizing large data content into more manageable forms for users. In one aspect, a system that facilitates data presentation and management is provided. The system includes at least one database to store a corpus of data relating to one or more topics and a summarizer component to automatically determine a subset of the data over the corpus of data relating to at least one of the topic(s), wherein the subset forms a summary of the at least one topic.

As used in this application, the terms "component," "summarizer," "profile," "database," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
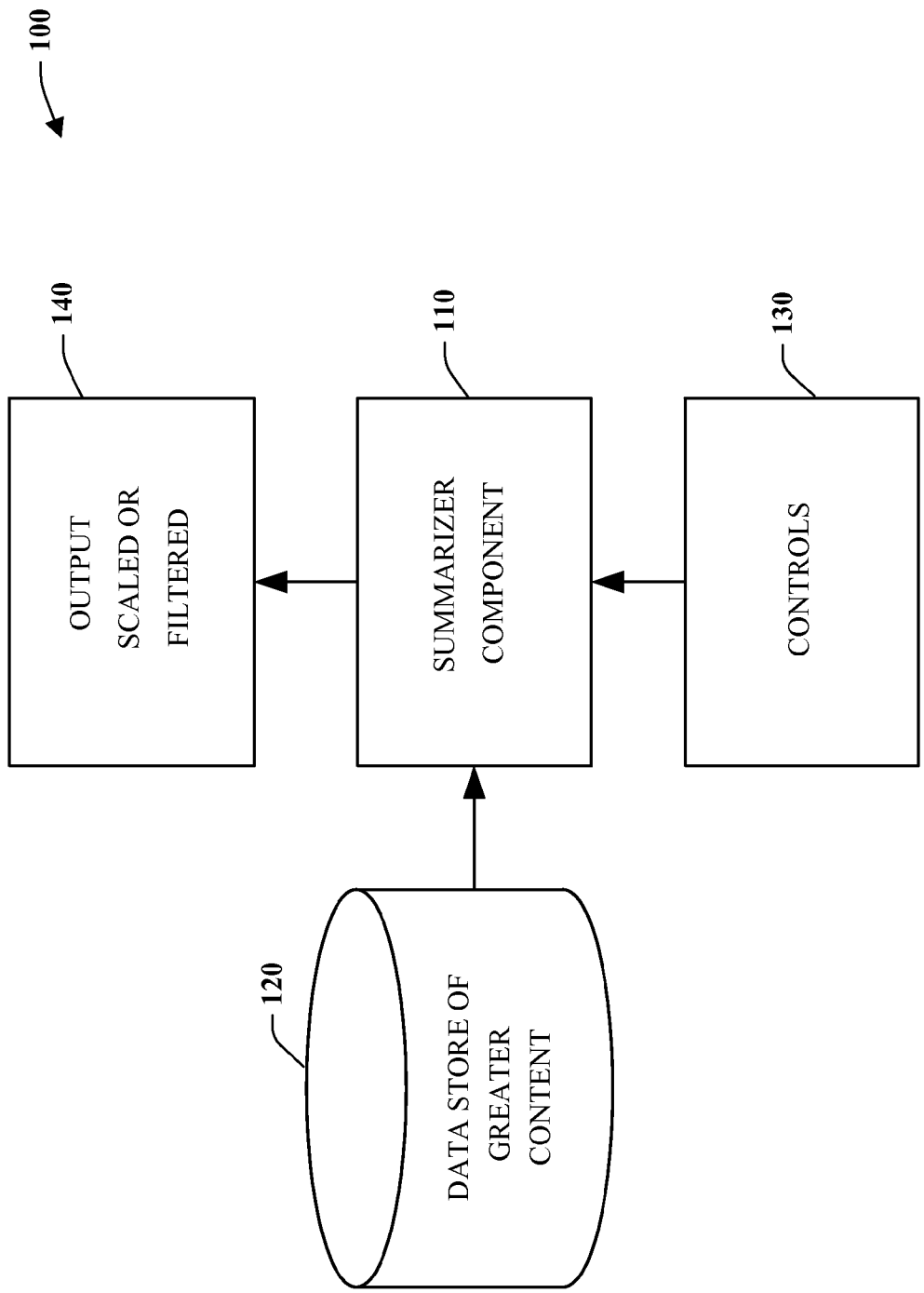
FIG. 1 is a schematic block diagram illustrating an automatic summary and filter system for data management.

Referring initially to FIG. 1, a system 100 is illustrated for automatic summary generation of data and to facilitate efficient data management for users. The system 100 includes a summarizer component 110 that processes data from a data store 120. Such data can be gleaned and analyzed from a single source or across multiple data sources, where such sources can be local or remote data stores or databases. The summarizer component operates over or across a given file or files to automatically generate output 130 that has been scaled down or filtered to facilitate more efficient processing of large quantities of data 120. For instance, a single file may be read at 120 where the file is processed over its respective length (e.g., three pages of data contained in the file). Base upon an analysis of the file, the summarizer component 110 automatically determines a summary or a reduced set of data that has been processed from the file. This is in contrast to present search systems that may provide a data caption based on the title or the first few words of a document which may have little resemblance to the actual contents of the file.

As will be described in more detail below, the summarizer component 110 can process various forms of data and can output various summarized forms at 130. For example, audio or video data can be analyzed by the summarizer 110 where respective summary clips or otherwise are presented at 130. Hybrid output forms at 130 can include mixing summarized data such as text with other summarized forms such as audio which is also described in more detail below. As shown, controls 140 can be provided to regulate and refine how summaries are created. For example, a simple control may regulate the number of words that are captured in the summary at 130. More sophisticated controls 140 may include filter concepts that reduce certain types of data based on a user's particular preferences. User profiles can be created that help control how the summarizer component 110 operates and ultimately generates output at 130. As will be described in more detail below, user actions and activities can be monitored over time to determine preferences regarding how output should be presented at 130. This can include monitoring access to the data store 120 over time to determine the types of information that the user is interested in based on an initial pass of data. Other types of analysis performed by the summarizer component 110 include monitoring words within a file or data source at 120 for clues that may lead to a conclusion that some data within the file is currently in summarized form. For instance, words like abstract, summary, conclusion and so forth provide clues that the following paragraphs are currently presented in summary form. As will be described in more detail below, filter controls may still be applied to an already summarized form. For instance, some users may not want to see certain words appearing in a filtered output at 130 (e.g., summarizer for children's material filtering out more complicated adult terms).

In one aspect, the system 100 can operate as an automatic summary system that has the capability to analyze a large corpus of data at 120 and synthesize or summarize a subset of data to be presented in a more manageable form for a user. This can include determining non-related material or superfluous material and filtering out such data in real time. Filtering can be controlled via one or more controls 140. Thus, users can hone in on relevant and desired data in an efficient manner without having to weed through extraneous or more detailed data that is not needed at a given time. Controls 140 can be provided to let users adjust the amount of data provided in a given summary and to control the amount of respective filtering applied along with other features that are described in more detail below.

Summarized or filtered data at 130 can be employed as part of an interest database to automatically bring one up to speed on a given subject and in a rapid manner. This can include summarizing or filtering photographic libraries from 120 which are tailored to be most relevant to a user's current interests. Interests can be determined from user profiles and context database than can be updated, trained, and monitored over time. Summary data 130 can be employed as part of location tagging such as geographical locations to annotate a thought or a memory with a given location. This includes using summarized or filtered data 130 to allow experiences to be piggy-backed or built upon to form a larger collective of knowledge. Other types of filtering can include specific or form filtering where all components of a particular designation are filtered. For example, all words associated with a particular speaker or artist should be removed from a generated document or summary.

In another aspect, the system 100 operates as an automated data summarizer. This includes means for storing a set of data relating to one or more topics (data store 120) and means for analyzing the data (summarizer component 110) to determine a summarized subset of the data pertaining to at least one topic. This can also include means for controlling generation of the summarized subset of the data (controls 140). It is noted that the summarizer component 110 can be employed to process "data mash-ups." This includes the ability to process/incorporate example data sources such as Wikipedia, Encarta, my hard drive, and my MSN spaces, some of which are available via web services, and building or incorporating those data sources into the summarizer. This would allow dynamically generating or adjusting summaries by plugging in additional data sources in real time. Machine translation components can also be employed for data input analysis (sourcing across languages) and rendering output in multiple languages.

Figure 2:
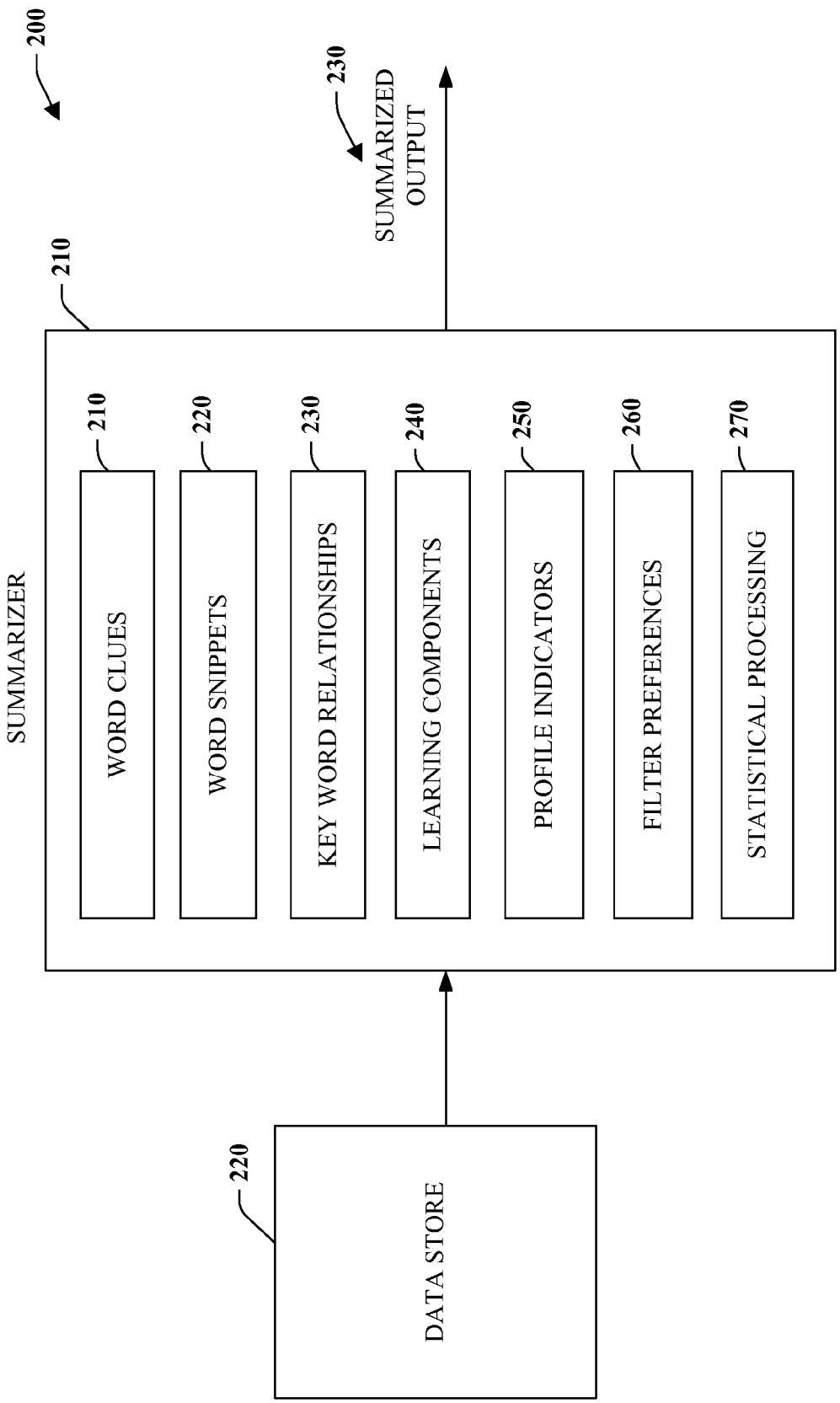
FIG. 2 is a block diagram that illustrates a summary generation and analysis system.

Referring now to FIG. 2, a summary generation and analysis system 200 is illustrated. The system 200 includes a summarizer component 210 that analyzes a data store 220 and automatically produces a summarized output 230. The summarizer shows example factors that may be employed to analyze a given media form to produce the output 230. It is to be appreciated that substantially any component that analyzes over and/or across a file or data form to automatically produce a reduced subset of data in summarized form at 230 can be employed.

Proceeding to 210, one aspect for analyzing data from the data store 220 (also can be real time analysis such as received from a wireless transmission source) includes word or file clues 210. Such clues 210 may be embedded in a document or file and give some indication or hint as to the type of data being analyzed. For example, some headers in file may include words such as summary, abstract, introduction, conclusion, and so forth that may indicate the generator of the file has previously summarized the given text. These clues 210 may be used by themselves or in addition to other analysis techniques for generating the output 230. For example, merely finding the word summary wouldn't preclude further analysis and generation of output 230 based on other parts of the analyzed data from 220. In other cases, users can control analysis by stipulating that if such words are found in a document that the respective words should be given more weight for the summarized output 230 which may limit more complicated analysis described below.

At 220, one or more word snippets may be analyzed. This can include processes such as analyzing particular portions of a document to be employed for generation of summarized output 230. For example, analyze the first 20 words of each paragraph, or analyze the specified number of words at the beginning, middle and end of each paragraph for later use in automatic summarization 230. Substantially any type of algorithm that searches a document for clusters of words that are a reduced subset of the larger corpus can be employed. Snippets 220 can be gathered from substantially any location in the document and may be restrained by user preferences or filter controls described below.

At 230, the summarizer may employ key word relationships to determine summarized output 230. Key words may have been employed during an initial search of a data store or specified specifically to the summarizer 210 via a user interface (not shown). Key words 230 can help the summarizer 210 to focus its automated analysis near or within proximity to the words so specified. This can include gathering words throughout a document that are within a sentence or two of a specified keyword 230, only analyzing paragraphs containing the keywords, numerical analysis such as frequency the key word appears in a paragraph. Again, controls can modify how much weight is given to the key words 230 during a given analysis.

At 240, one or more learning components 240 can be employed by the summarizer 210 to generate summarized output 230. This can include substantially any type of learning process that monitors activities over time to determine how to summarize data in the future. For example, a user could be monitored for such aspects as where in a document they analyze first, where their eyes tend to gaze, how much time the spend reading near key words and so forth, where the learning components 240 are trained over time to summarize in a similar nature as the respective user. Also, learning components 240 can be trained from independent sources such as from administrators who generate summary information, where the learning components are trained to automatically generate summaries based on past actions of the administrators. The learning components can also be fed with predetermined data such as controls that weight such aspects as key words or word clues that may influence the summarizer 210. Learning components 240 can include substantially any type of artificial intelligence component including neural networks, Bayesian components, Hidden Markov Models, Classifiers such as Support Vector Machines and so forth.

At 250, profile indicators can influence how summaries are generated at 230. For example, controls can be specified in a user profile described below that guides the summarizer in its decision regarding what should and should not be included in the summarized output 230. In a specific example, a business user may not desire to have more complicated mathematical expressions contained in a summary at 230 where an Engineer may find that type of data highly useful in any type of summary output. Thus, depending on how preferences 250 are set in the user profile, the summarizer 210 can include or exclude certain types of data at 230 in view of such preferences.

Proceeding to 260, one or more filter preferences may be specified that control summarized output generation at 230. Similar to user profile indicators 250, filter preferences 260 facilitate control of what should or should not be included in the summarized output 230. For example, rules or policies can be setup where certain words or phrases are to be excluded from the summarized output 230. In another example, filter preferences 260 may be used to control how the summarizer 210 analyzes files from the data store in the first place. For instance, if a rule were setup that no mathematical expression were to be included in the summarized output 230, the summarizer 210 may analyze a given paragraph, determine that it contains mostly mathematical expressions and skip over that particular paragraph from further usage in the summarized output 230. Substantially any type of rule or policy that is defined at 260 to limit or restrict summarized output 230 or to control how the summarizer 210 processes a given data set can be employed.

At 270, substantially any type of statistical process can be employed to generate summarized output 230. This can include monitoring certain types of words such as key words for example for their frequency in a document or paragraph, for word nearness or distance to other words in a paragraph (or other media), or substantially any type of statistical processes that is employed to generate a reduced subset of summarized output from a larger corpus of data included with the data store 220.

Figure 3:
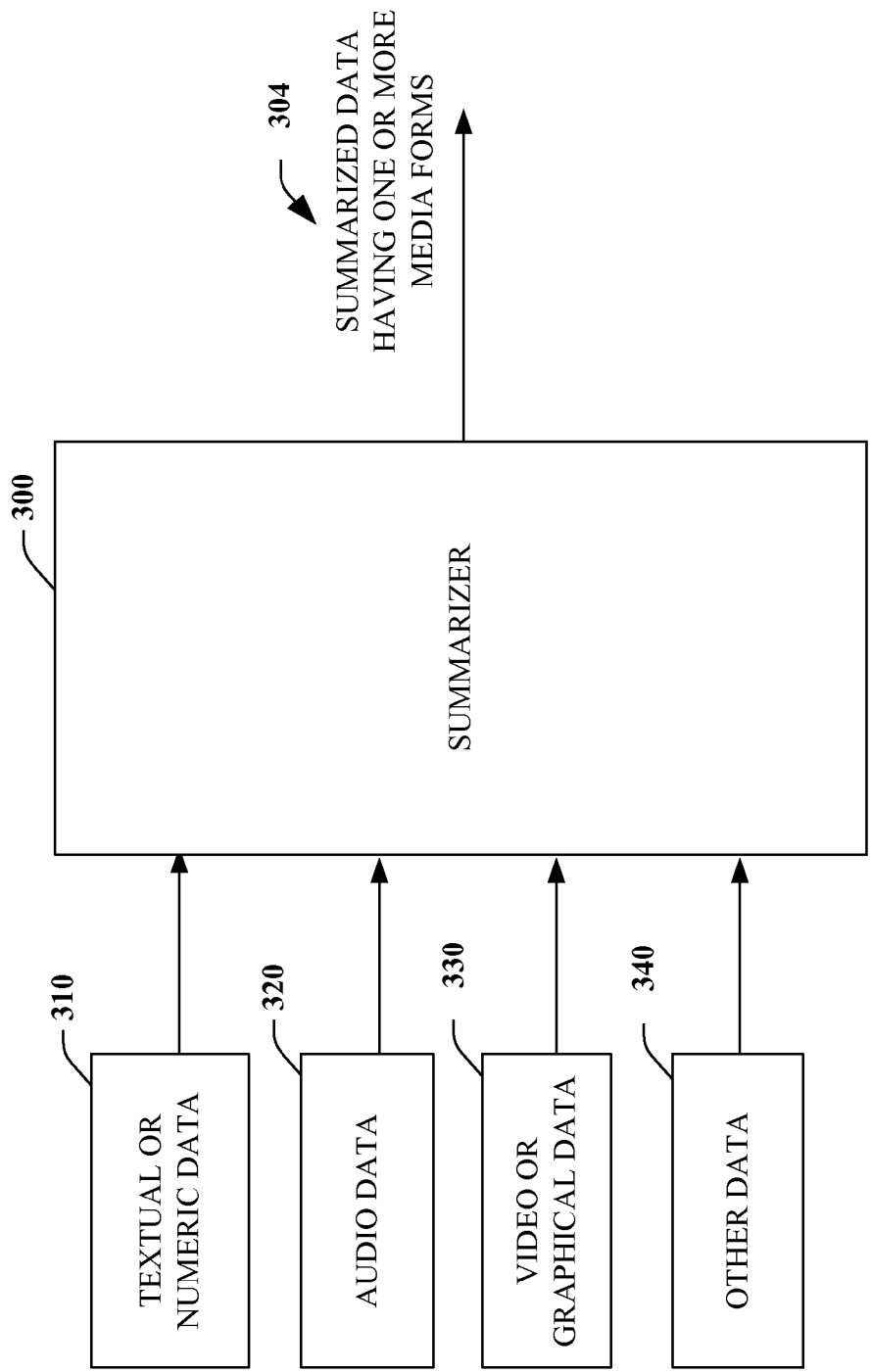
FIG. 3 illustrates a hybrid summarization system where various forms of media can be employed as input and used to generate summarized output.

Turning to FIG. 3, a hybrid summarization component 300 is illustrated where various forms of media can be employed as input and used to generate summarized output 304. In this aspect, data can be analyzed in various forms, summarized at 300, where the summarized output can include one or more of the various forms. As previously described, textual or numeric data can be analyzed at 310. This can include substantially any type of textual or mathematical data and can be in the form of substantially any type of spoken language, computer language, or such languages as scientific expressions for example.

At 320, audio data can be analyzed and employed to generate summarized output 304. Such data can be analyzed in real time or from an audio file such as a wav file for example or other format. Natural language processors (not shown) can be employed or media can be changed in one form, analyzed to determine output 304, and stored in summary form in the given media type. For example, an audio file 320 could be converted to text, analyzed by the summarizer 300 to determine which portion of the audio file should be included as part of the summary, and then storing that portion as audio even though the analysis was performed in text.

At 330, video or graphical data can be analyzed an employed as part of summarized output 304. Similar to audio data 320, graphical files or real time video streams can be analyzed. In one example, clips of audio 320 or video 330 can be captured and used for summarized data 304. This can include analyzing a scene or a sound for repetitious portions and using at least one of the portions for the clip or removing portions that are determined to be repetitious. This can include cropping pictures or video to capture the gist of a scene yet reducing the overall amount of data that a user may need to process at 304. As shown, other data formats 340 that may not have been described herein can also be summarized at 300 (generate a reduced dataset there from) and employed to generate summarized output 304. It is noted that the summarized output 304 can include one or more forms of the data processed at 310 through 340. For example, summarized output 304 can include textual summaries, mathematical summaries, audio summaries, photographic summaries, video summaries and/or so forth.

Figure 4:
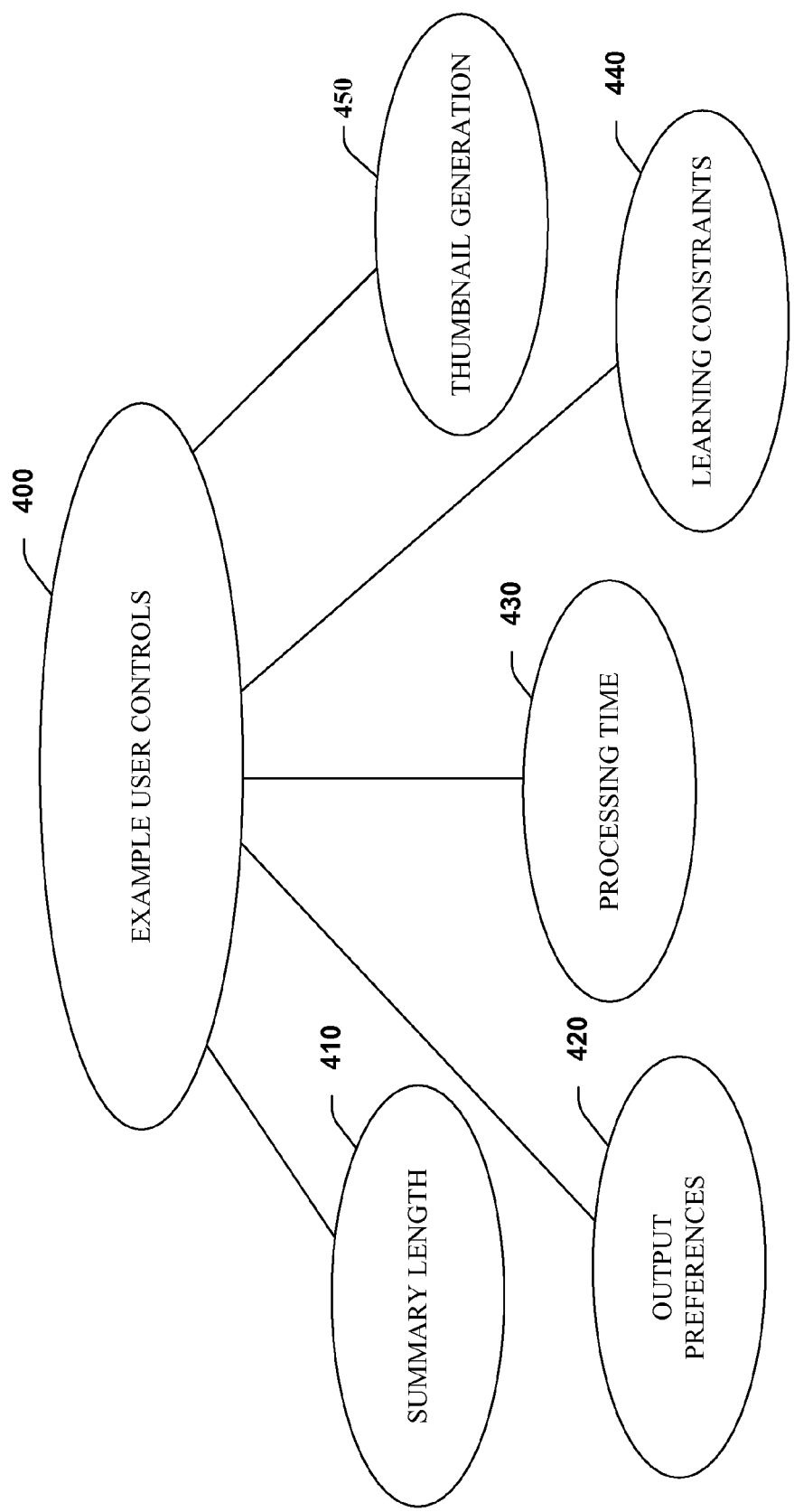
FIG. 4 illustrates example user controls for controlling operations of summarizer components.

Referring to FIG. 4, example user controls 400 are illustrated for controlling the summarizer components described above. Various controls 400 can be provided that allow users to tailor how summary output is generated and presented to the respective user. In one example, a summary length control 410 can be provided that regulates how large or small a given summary can be. This can include specifying a file size or other parameter such as word length, page length, paragraph constraints and so forth. At 420, one or more output preferences can be specified. This can include specifying font sizes, colors, audio levels, output display size or display real estate requirements for example. Other types of preferences 420 may include enabling or disabling the types of media that may be included in a respective summary such as text, audio, video and so forth.

At 430, processing time can be a parameter to control summary generation. In this case, summary generation components may display more accuracy or be better suited to a user's summary preferences if more processing time is spent. In other cases, speed is of the essence where accuracy in generation of the summary can be potentially traded off. At 440, learning constraints can be modified or specified. This can include selecting the types of algorithms that may be employed, specifying whether past user monitoring data is to be employed, or whether or not learning components in the system should or should not be used in the generation of a given summary or set of summaries. At 450, thumbnail generation controls can be provided. This can include controlling the look and form of summary output. For instance, a text document can be reduced to a small display area where auto generated text in summary form is included in the thumbnail. For more formal presentations, thumbnail options may be disabled where summary paragraphs or text is shown in a larger or different form than a small thumbnail view. As can be appreciated, audio or video thumbnails can also be specified and controlled.

Figure 5:
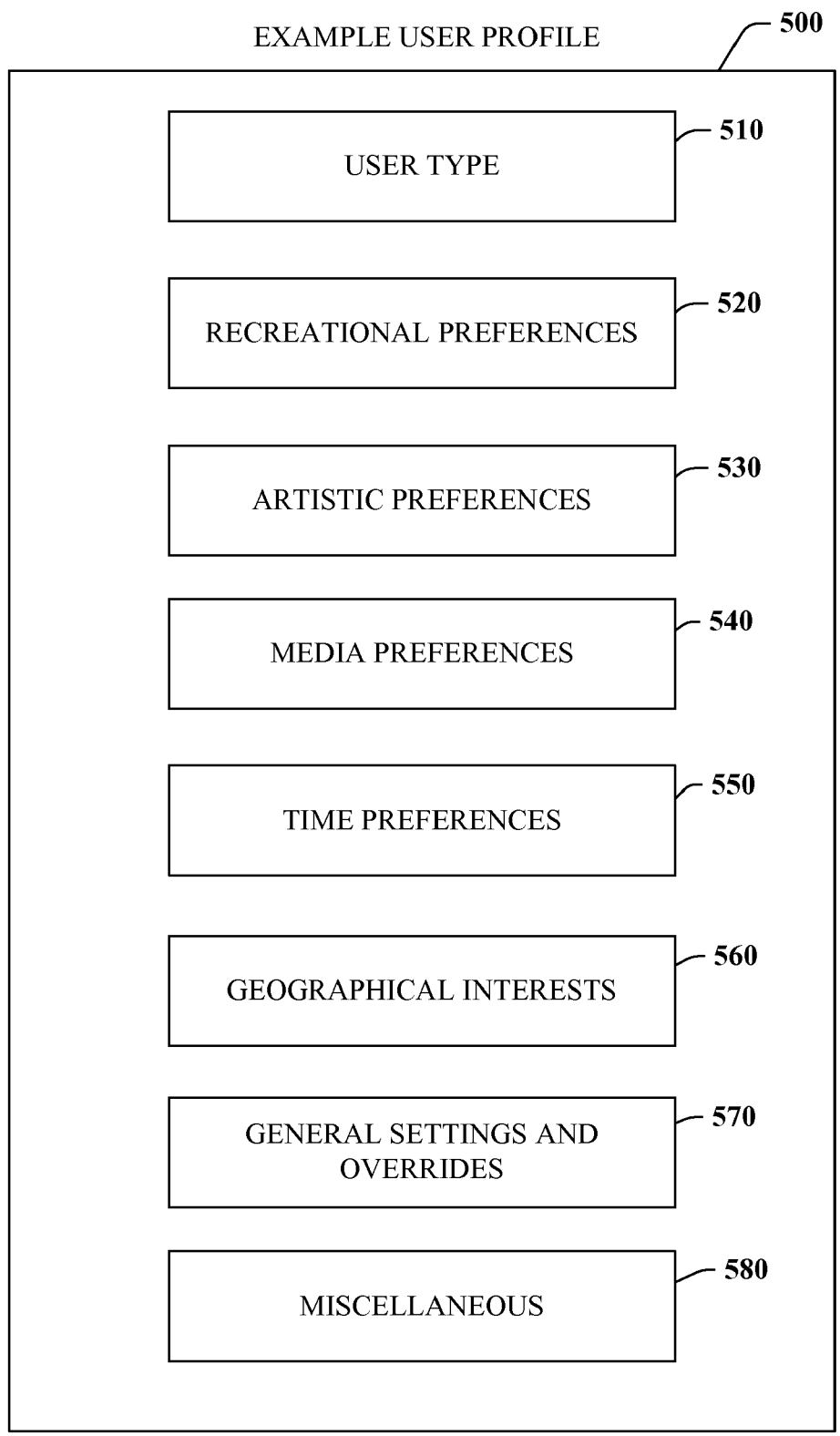
FIG. 5 illustrates an example user profile that can be employed to control summary generation.

Proceeding to FIG. 5, an example user profile 500 is illustrated that can be employed to control summary generation. In general, the profile 500 allows users to control the types and amount of information that may be captured in summary form. Some users may prefer to receive more information associated with a given data store whereas others may desire information generated under more controlled or narrow circumstances. The profile 500 allows users to select and/or define options or preferences for generating summary data. At 510, user type preferences can be defined or selected. This can include defining a class for a particular user such as adult, child, student, professor, teacher, novice, and so forth that can help control how much and the type of summary data that is created. For example, a larger or more detailed summary can be generated for a novice user over an experienced one.

Proceeding to 520, the user may indicate recreational preferences. For instance, the user may indicate they are sports enthusiasts or other activity that can influence the decision making processes of the summary generator. Such constraints help to add additional context to summary generation above and beyond key words for example. As can be appreciated, recreational constraints can be placed over a plurality of differing circumstances. At 530, artistic preferences may be defined. Similar to recreational preferences 520 to control summary generation and algorithm performance, this aspect may include indicating movie, musical, or other artistic genres a user may be interested that may be employed to refine a summary output and provide additional context. For example, a user interested in music that searches for the terms "Nirvana lyrics" may also like to have Nirvana audio snippets included within the respective summary. Other aspects could include specifying media preferences at 540, where users can specify the types of media that can be included and/or excluded form a respective summary output. For example, a user may indicate that summaries are to include text and thumbnail images only but no audio or video clips are to be provided in the summary.

Proceeding to 550, time preferences can be entered. This can include absolute time information such as only provide perform summary generation activities on weekends or other time indication. Ranges can be specified such as process these 10 files for summaries between 2:00 and 4:00 this afternoon. This can also include calendar information and other data that can be associated with time or dates in some manner. At 560, geographical interests can be indicated to tailor how summary is generated or presented to the user. For instance, some users may not want to see more detailed summaries while at work and more general summaries when they are at a leisure location such as at a coffee shop or via wideband connection outdoors somewhere.

Proceeding to 570, general settings and overrides can be provided. These settings at 570 allow users to override what they generally use to control summary information. For example, during normal work weeks, users may screen out want detailed summaries generated for all files generated for the week yet the override specifies that the summaries are only to be generated on weekends. When working on weekends, the user may want to simply disable one or more of the controls via the general settings and overrides 570. At 580, miscellaneous controls can be provided. These can include if then constructs or alternative languages for more precisely controlling how summary algorithms are processed and controlling respective summary output formats.

The user profile 500 and controls described above with respect to FIG. 4 can be updated in several instances and likely via a user interface that is served from a remote server or on a respective mobile device if desired. This can include a Graphical User Interface (GUI) to interact with the user or other components such as any type of application that sends, retrieves, processes, and/or manipulates data, receives, displays, formats, and/or communicates data, and/or facilitates operation of the system. For example, such interfaces can also be associated with an engine, server, client, editor tool or web browser although other type applications can be utilized.

The GUI can include a display having one or more display objects (not shown) for manipulating the profile 500 including such aspects as configurable icons, buttons, sliders, input boxes, selection options, menus, tabs and so forth having multiple configurable dimensions, shapes, colors, text, data and sounds to facilitate operations with the profile and/or the device. In addition, the GUI can also include a plurality of other inputs or controls for adjusting, manipulating, and configuring one or more aspects. This can include receiving user commands from a mouse, keyboard, speech input, web site, remote web service and/or other device such as a camera or video input to affect or modify operations of the GUI. For example, in addition to providing drag and drop operations, speech or facial recognition technologies can be employed to control when or how data is presented to the user. The profile 500 can be updated and stored in substantially any format although formats such as XML may be employed to store summary information.

In another aspect, contextual keyword weighting can be employed to adjust summarized functionality and/or output. For example, a keyword browser can be employed for summary control and output. The browser operates by surfacing each related term as a search link. Thus, instead of only supporting clicking on a keyword, by clicking anywhere on a screen interface and repositioning a cursor, one could change the summary in a pane e.g., to the right pane (or other location) on the fly.

Figure 6:
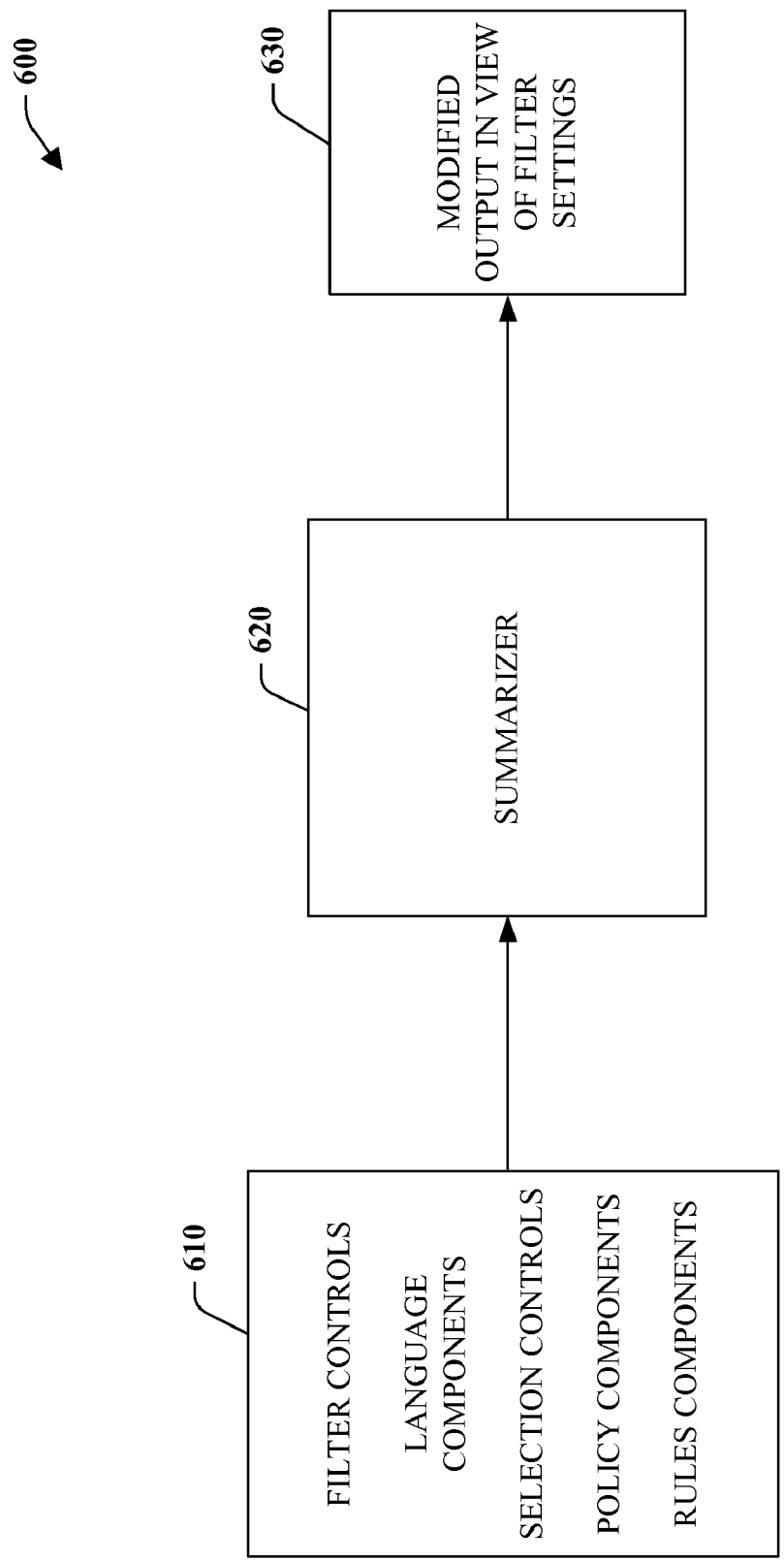
FIG. 6 illustrates filter controls for controlling summarized data generation.

Referring to FIG. 6, a system 600 illustrates filter controls 610 for controlling summarized data. One or more filter controls 610 can be provided that operate to control a summarizer 620 and ultimately control how summarized output data is generated shown as modified output 630. The filter controls 610 can include one or more language components (e.g., programming languages such as Java or C++) that can be employed to modify operations of the summarizer 620. This may include variable or other type of parameter data that may modify summarizer objects within the summarizer 620. Other type of filter controls 610 may include selection controls. These may include input or check boxes that enable or disable certain types of data from being included within the respective summary 630. For example, one selection may be to exclude numeric data from being included in the output 630.

Substantially any type of control that enables or disables features of the summarizer or acts to modify content of a summary can be employed where the respective controls can be associated with a user interface for example. Still et other types of filter controls 610 can include policy or rules components that can provide if then or else constructs for example to further define and refine how summarized output data appears at 630. As noted previously, other types of filtering controls 610 can include specific or form filtering where all components of a particular designation are filtered. For example, all words associated with a particular speaker or artist should be removed from a generated document or summary. The controls 610 can provide input interface locations to specify such forms.

Figure 7:
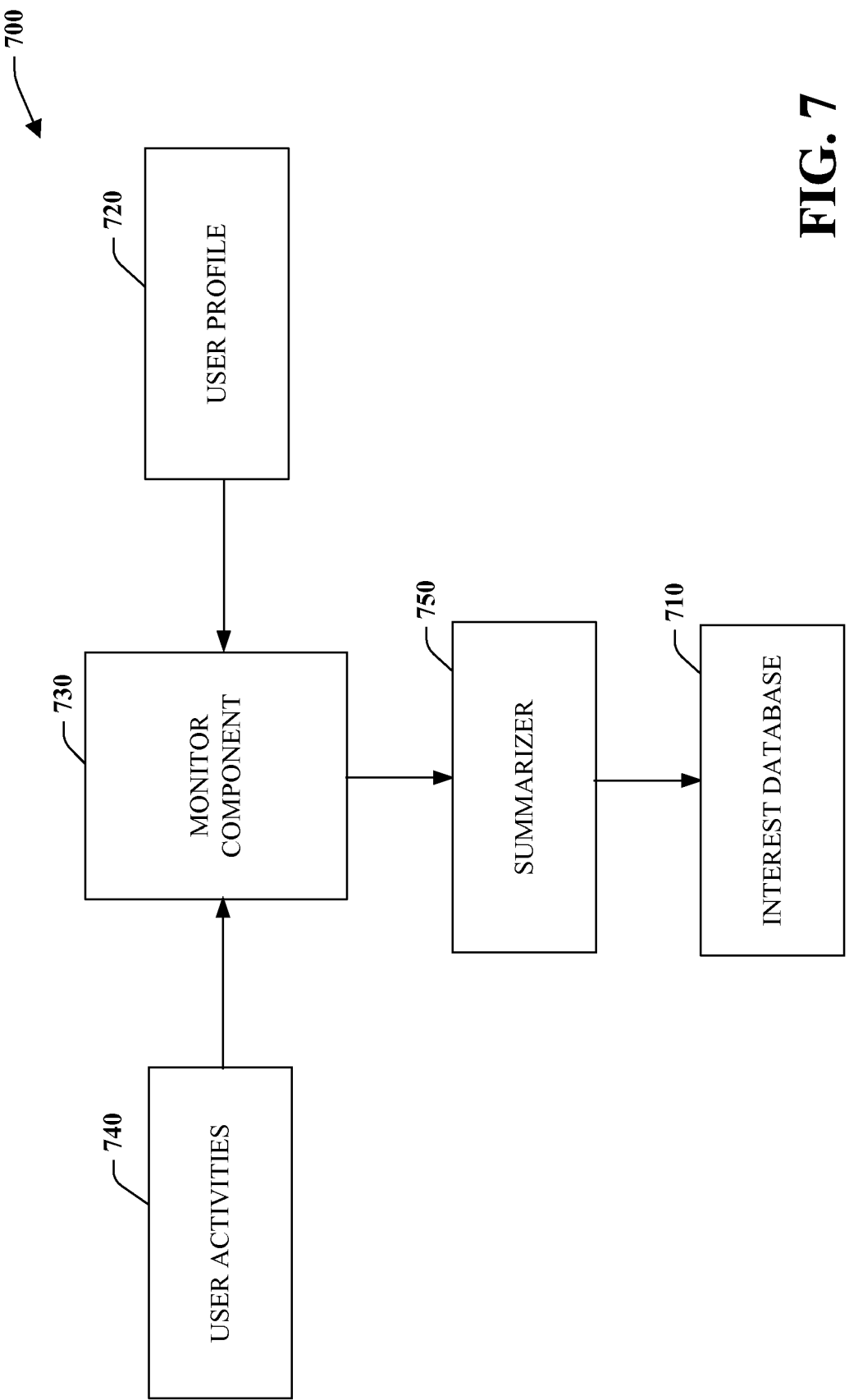
FIG. 7 illustrates a system that utilizes summarized data to build a current interests database.

Referring to FIG. 7, a system 700 illustrates a system that utilizes summarized data to build a current interests database 710. Summarized data can be employed as part of the interest database 710 to automatically bring one up to speed on a given subject and in a rapid manner. This can include summarizing or filtering photographic libraries which are tailored to be most relevant to a user's current interests. Interests can be determined from user profiles 720 and context database than can be updated, trained, and monitored over time via a monitor component 730. As shown, the monitor component 730 can also monitor user activities 740 to determine potential interests or preferences over time. Output from the monitor component 730 can be fed to a summarizer 750 which updates the interest database 750 over time.

Figure 8:
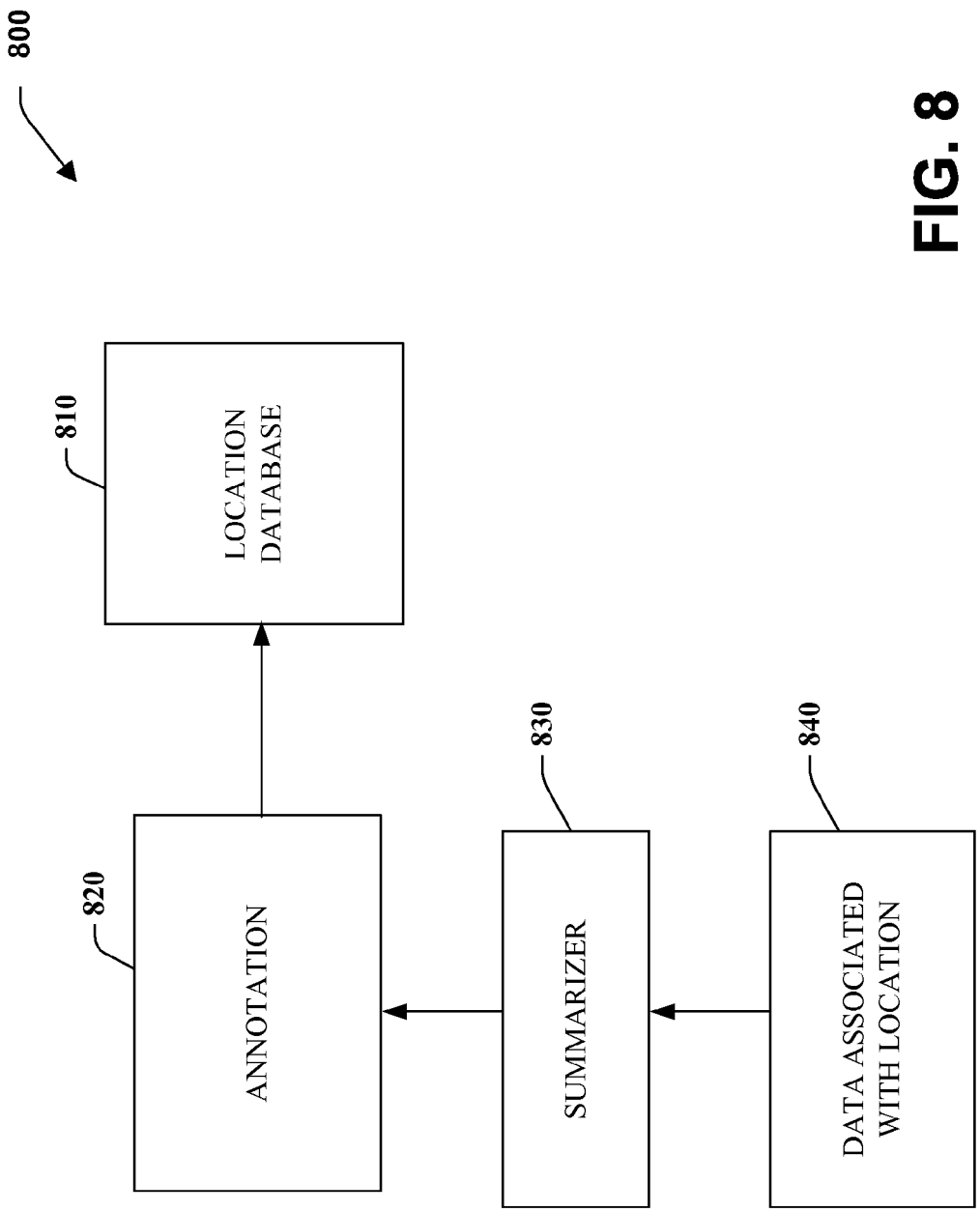
FIG. 8 illustrates location tagging that employs summarized data.

Referring now to FIG. 8, a system 800 illustrates location tagging that employs summarized data. In this aspect, summary data can be employed as part of location tagging such as geographical locations to annotate a thought or a memory with a given location. As shown, a location database 810 which can be a local data store or remote database receives data from an annotation component 820. The annotation component 820 is driven from a summarizer component 830. Data that is associated with a location or other experience at 840 is summarized at 830 to form an annotation at 820 which is subsequently stored at the location database 810. For example, one might dictate into a cell phone memory at 840 regarding a location experience such as witnessing the Grand Canyon for the first time. Data that is captured via the cell phone is summarized at 830 to form annotation 820 which is subsequently stored at 810. The storage at 810 could be on the cell phone or wirelessly updated via the cell phone for example. When the location database 810 is referenced in the future per the respective location, one or more annotations 820 that have been previously stored can be retrieved.

Figure 9:
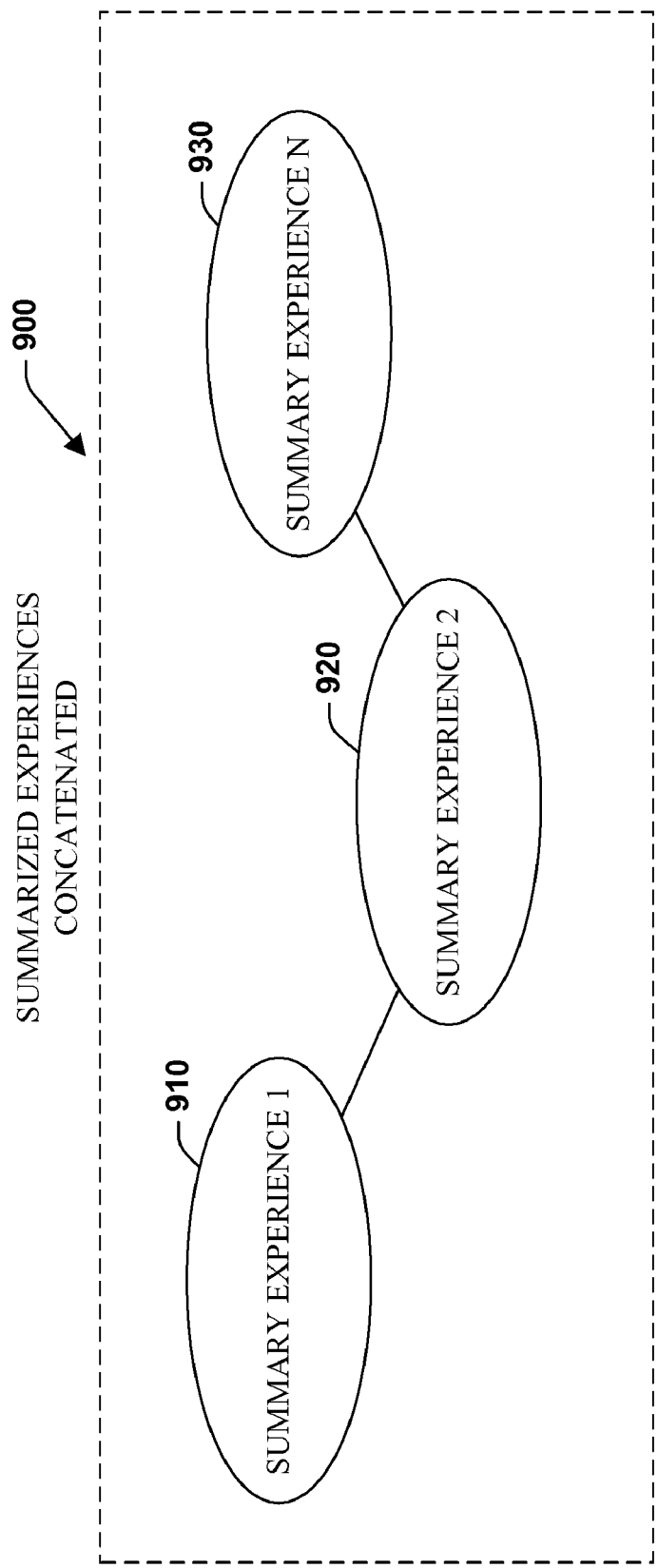
FIG. 9 illustrates summarized data that has been concatenated.

Referring to FIG. 9, summarized data 900 that has been concatenated is illustrated. In this aspect, summarized or filtered data can be concatenated or piggy-backed as shown at 910-930. Such summaries can be built from existing summarized data and employed to form a larger collection of knowledge yet still be based off of previously generated summaries. For example, a first summary at 910 could be based off of a first users experience upon visiting a given location. Other summaries at 920 and 930 could be added or associated with the first summary to form group experiences for visiting the same location yet still relay such experiences as a concatenation of summaries. As can be appreciated, summaries could relate to common experiences or be grouped from unrelated experiences or summarized topics/queries.

Figure 10:
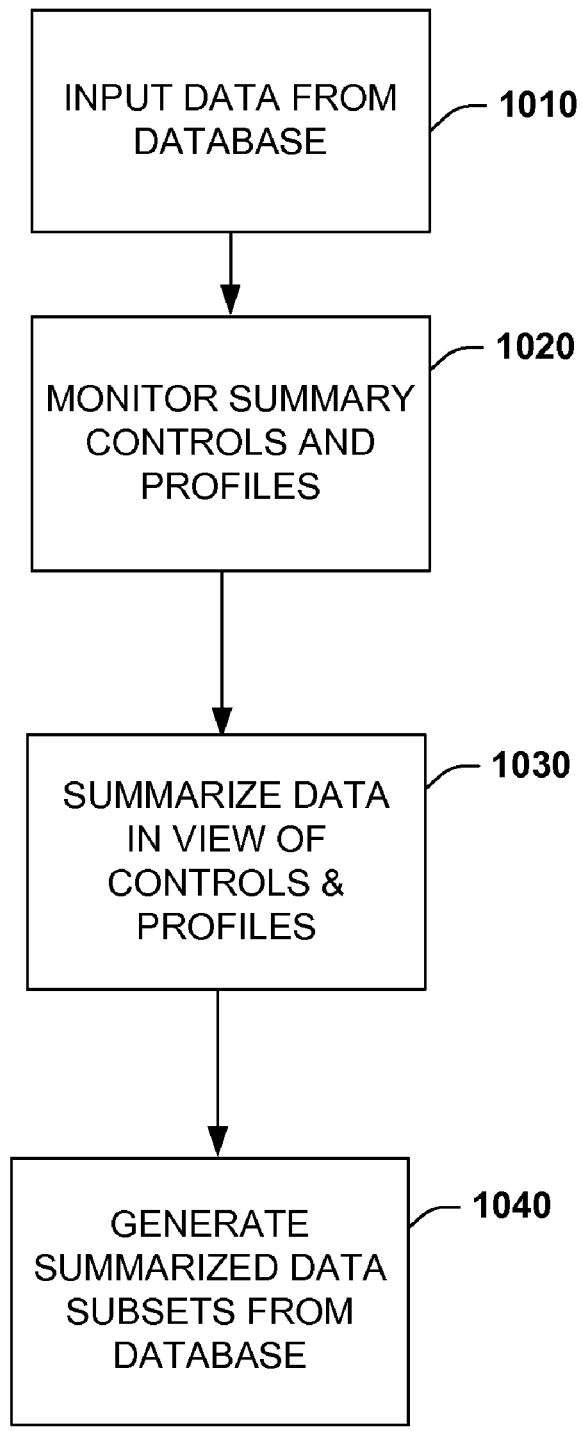
FIG. 10 illustrates an exemplary process for automatically generating summarized data.

FIG. 10 illustrates an exemplary process 1000 for automatically generating summarized data. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 1010 of the process 1000, data is received from a database or databases. This could include local databases such as are read from a mobile device or from a desktop computer for example and/or can include remote databases that can be accessed over the Internet for example. At 1020, summary controls and profiles are monitored. As noted above, user profiles can specify such aspects as user preferences, user types, media preferences, and so forth that can be employed to control how summary data is generated. Controls can include processing controls for controlling how long a summary algorithm is executed for example. Other controls can include learning constraints, thumbnail controls, summary length specifiers, or other preferences. These can include filtering preferences which act to limit the types of data that can appear in a summarized output file.

At 1030, data collected at 1010 is automatically summarized in view of the controls, profiles, or filters monitored at 1020. At 1040, summarized data is generated and stored. As previously noted, such data can be stored as individual summaries for differing topics, stored as annotations such as can be summarized from an event or location, or summarized as part of other content sources. Although not shown, user activities can be monitored over time to further refine and learn what types of data may be of interest to a particular user in summarized form.

Figure 11:
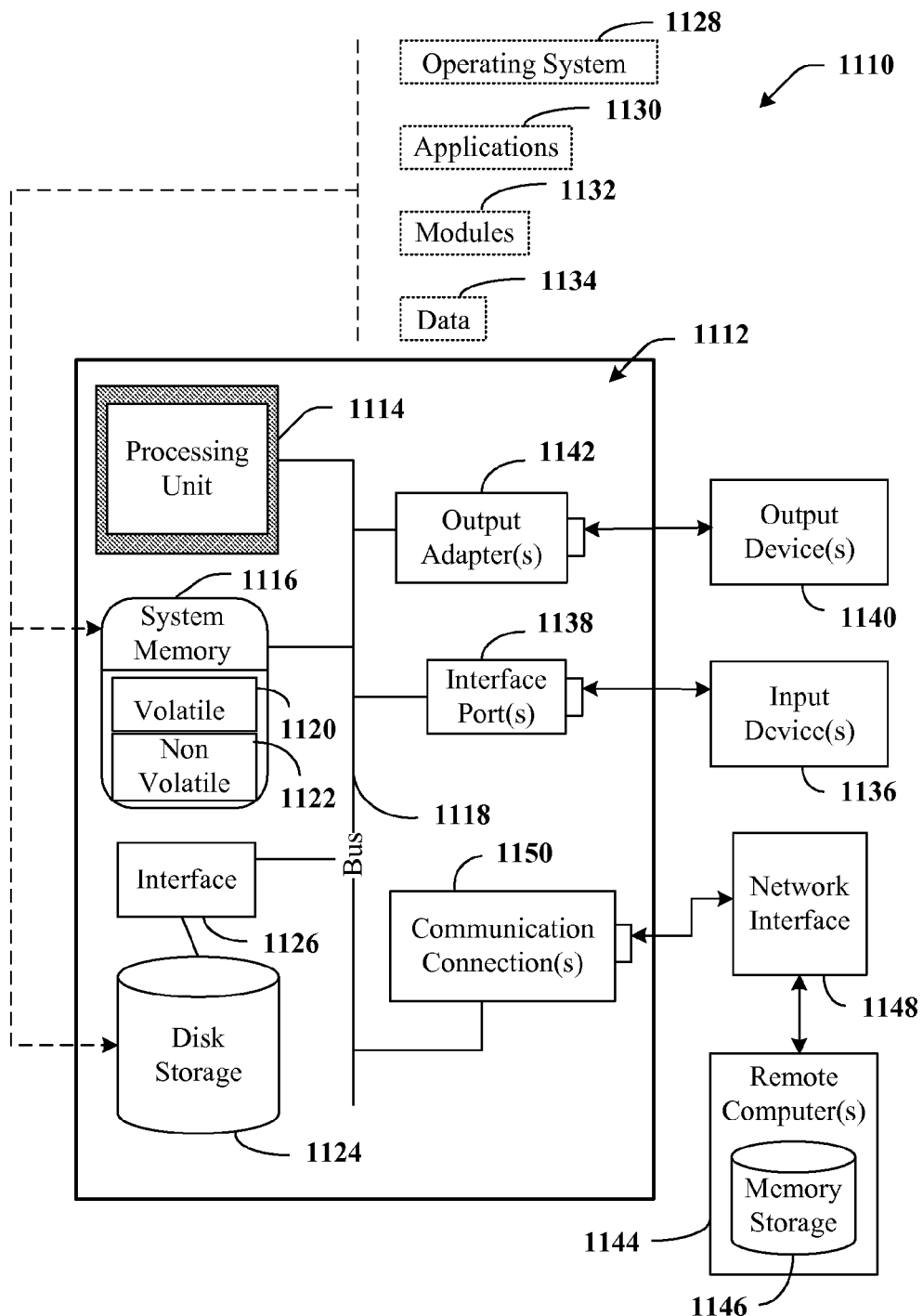
FIG. 11 is a schematic block diagram illustrating a suitable operating environment.
Figure 12:
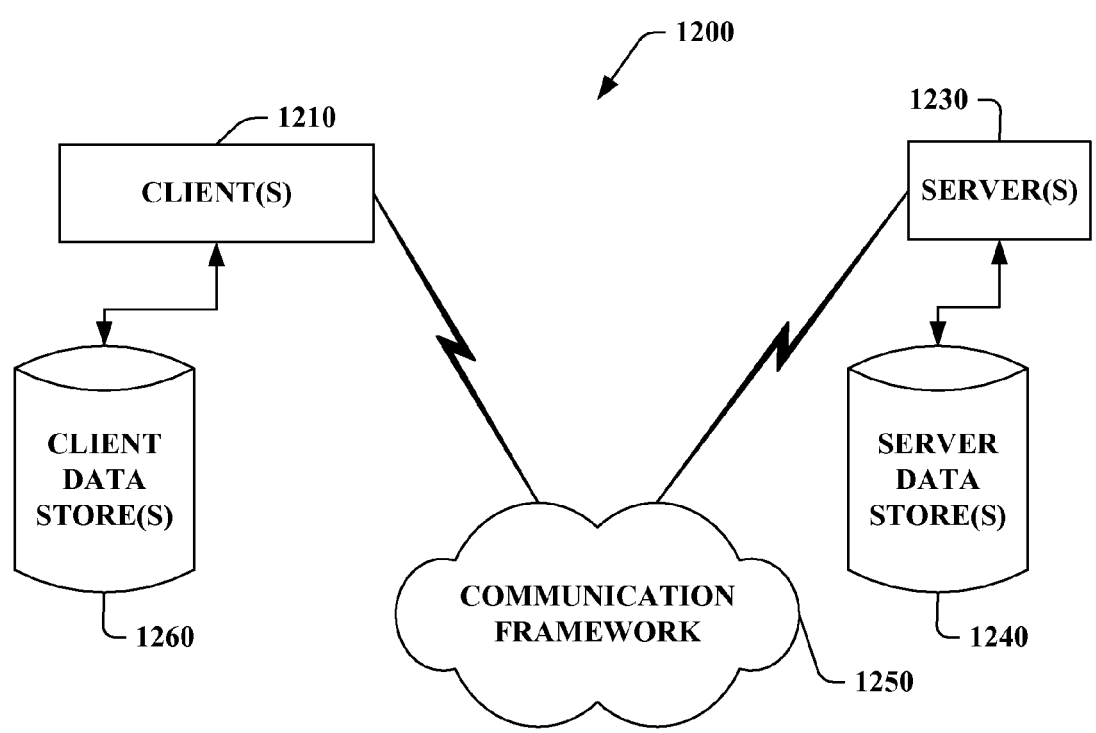
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1110 for implementing various aspects described herein includes a computer 1112. The computer 1112 includes a processing unit 1114, a system memory 1116, and a system bus 1118. The system bus 1118 couple system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that various components described herein can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 that can be employed. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the components described herein, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates data presentation and management, comprising:
   one or more processors;
   a memory that includes components that are executable by the one or more processors, the components including:
   at least one database to store a corpus of data relating to one or more topics; and
   a summarizer component to:
   automatically determine a subset of the data in the corpus of data relating to at least one of the one or more topics;
   recognize one or more words in the corpus of data that indicates the corpus of data includes a previously generated summary; and
   form the subset of data into a summary of the at least one topic, wherein words of the previously generated summary are given more weight during formation of the summary than other words in the subset of data.

2. The system of claim 1, further comprising a profile component to control data generated by the summarizer component.

3. The system of claim 2, the profile component includes a user type component to determine whether a user is a novice user or an experienced user, a recreational component to determine recreational activity preferences of the user, an artistic component to determine artistic interests of the user, a media component to determine types of media that are included in the summary, a time component to determine when the summary is to be generated, a calendar component to provide calendar and time data to the time component, a geographical component to determine an amount of detail to include in the summary based on a geographical location of the user, or a general settings component to control additional information included in the summary.

4. The system of claim 1, further comprising a filter component to control data generated by the summarizer component.

5. The system of claim 4, the filter component includes a language component, a selection component, a policy component, or a rules component.

6. The system of claim 1, the summarizer component further comprises a word clues component to locate one or more clues, a word snippets component to analyze a sequence of words, a key word component to focus an analysis near or within a proximity of a key word, a learning component to train the summarizer component to analyze the corpus of data, a profile component to format data generated by the summarizer component according to a user profile, a filter component to filter data generated by the summarizer component according to one or more filtering criteria, or a statistical component to monitor a frequency that a keyword occurs or a distance of a word to other words.

7. The system of claim 1, further comprising one or more controls to operate with the summarizer component.

8. The system of claim 7, the controls include a length component to regulate a length of the summary, a preferences component to regulate a format of the summary, a processing time component to regulate an amount of processing time the summarizer uses to analyze the corpus of data and a speed at which the summary is generated, a thumbnail component to regulate a presentation of the summary, a machine translation component to translate the summary from a first language to a second language, and a learning constraint component to regulate an algorithm use by the summarizer to generate the summary.

9. The system of claim 1, the summarizer component operates on mixed media data to generate one or more summaries.

10. The system of claim 9, the mixed media data is associated with text data, numeric data, audio data, image data, or video data.

11. The system of claim 9, the summarizer component generates summarized data having at least two forms of mixed media.

12. The system of claim 1, further comprising an input component to capture data from a location.

13. The system of claim 12, further comprising a component to automatically summarize the data from the location.

14. The system of claim 13, further comprising a component to store summarized data as an annotation from the location.

15. The system of claim 1, further comprising a component to filter or summarize photographic libraries which are tailored to the user's current interests.

16. The system of claim 15, the user's current interests are determined from a user profile or by a component that monitors user activities over time.

17. The system of claim 1, further comprising a component concatenate summarized data from at least two topics.

18. A method to generate summary data for a user, comprising:
   one or more processors;
   reading data from a database that includes a corpus of data;
   recognize one or more words in the corpus of data that indicates the corpus of data includes a previously generated summary;
   determining an amount of time available to process the corpus of data for summary generation based on a user preference; and
   automatically summarizing the corpus of data into at least one subset of data to generate a summary such that an accuracy of detail in the summary is proportional to the amount of time available to process the corpus of data, wherein words included in the previously generated summary are given more weight during generation of the summary than other words in the at least one subset of data.

19. The method of claim 18, further comprising employing a filter or a user profile to summarize the corpus of data.

* * * * *